United States Patent
Neander

[11] 3,726,235
[45] Apr. 10, 1973

[54] CARRIAGE STRUCTURE FOR COORDINATE GAS CUTTING MACHINES

[75] Inventor: Erich Neander, Weisskirchen, Germany

[73] Assignee: Messer Griesheim GmbH, Frankford/Main, Germany

[22] Filed: Aug. 10, 1970

[21] Appl. No.: 62,374

[30] Foreign Application Priority Data

Aug. 28, 1969 Germany..................P 19 43 686.3

[52] U.S. Cl. ..................105/396, 52/693, 248/2, 266/23 K
[51] Int. Cl. ................................B61d 49/00
[58] Field of Search......................105/396, 404, 329, 105/422, 397; 29/470.5; 248/2; 266/23 K; 52/693, 690

[56] References Cited

UNITED STATES PATENTS

| 2,056,218 | 10/1936 | Stout | 105/396 |
| 2,595,858 | 5/1952 | Kuhler | 105/329 R |
| 3,035,531 | 5/1962 | Leriche | 105/404 |
| 3,637,252 | 1/1972 | Metsker | 105/404 |

*Primary Examiner*—James B. Marbert
*Assistant Examiner*—Richard A. Bertsch
*Attorney*—Ernest F. Marmorek

[57] ABSTRACT

The carriage is assembled of prefabricated structural parts in the form of section pipes of rectangular cross-section. The parts are joined by simple angle irons which have one side machined and bolted to a corresponding machined side of another angle iron. The remaining sides of the bolted angle irons are welded in unmachined condition to the preassembled and aligned structural parts.

4 Claims, 5 Drawing Figures

CARRIAGE STRUCTURE FOR COORDINATE GAS CUTTING MACHINES

BACKGROUND OF THE INVENTION

This invention relates generally to coordinate gas cutting machines which serve to a fully automatic gas cutting process controlled in accordance with scaled-down drawings or negatives. These drawings or negatives are projected on a ground glass plate by means of an optical displaying table. The gas cutting process can also be controlled numerically by the aid of punched tapes or other conventional information carrying means to provide the desired cutting trace.

A prior art coordinate gas cutting machine consists basically of a performing machine, a transmitting machine and, depending on the type of the accessory equipment, of an optical displaying table or of an electrical controlling equipment having suitable information carriers such as punched tapes, for example, and a check mark device.

The performing machine comprises a runway, a transversing carriage on the runway, a cross-carriage, torch suspension means and various switching and controlling parts including switching boards and gas controls and conduits.

The electric equipment of the prior art coordinate gas cutting machine is situated preferably on a horizontal plate arranged between the front and rear cross-beams, and is protected against dust by metal sheet coverings.

The above described known embodiments have the drawback that due to the interconnected electrical wiring, particularly in numerically controlled machines and in machines with double driving members in the transverse direction, it is almost impossible to disassemble the machine and thereby facilitate its transport.

Since a complete coordinate gas cutting machine has dimensions exceeding 5m × 20m × 2m and the weight more than 15 tons, its transport is not only costly but also extremely inconvenient. For instance, during the shipment, an oversized occupied space with numerous dead areas will result, thus making the transport very expensive. Furthermore, when the complete coordinate gas cutting machine is forwarded by ship, the necessary unloading and reloading operations may become very troublesome. The massive cross-beams of the transversing carriage in the prior art performing machines also contribute to the overweight of the completed gas cutting machine.

This invention relates particularly to the structure and arrangement of the transversing carriage. In known structures of these carriages, the end surfaces of the cross-beams as well as the corresponding fastening pads on the transverse wheel boxes must have been accurately machined in huge milling and drilling machines. Also the reinforcing transverse beams extending between the cross-beams must have been accurately shaped on large parallel planers. All these machining operations are very expensive since the employed machine tools must have corresponding dimensions, that is in the range of 20 meters or even more.

SUMMARY OF THE INVENTION

It is, accordingly, an object of this invention to avoid the aforementioned disadvantages of prior art coordinate gas cutting machines.

More particularly, it is an object of this invention to improve the structure and reduce weight of the transversing carriage of these machines.

Another object of this invention is to eliminate to a great extent the necessity of accurate machining.

Still another object of this invention is to provide an assembly of prefabricated structural parts, which can be without difficulty disassembled in order to facilitate their transportation. After the arrival on the site of installation, the machine can be easily reassembled without the need of any special skill and instructions.

According to this invention, the above objects are attained by providing a carriage assembled of prefabricated section tubes preferably of a rectangular cross-section, and by joining these section tubes by simple angle irons. In the connection between two section tubes, one side of the angle iron is welded to the corresponding portion of the section tube whereas the other angle side is joined to the abutting angle side of the opposite angle iron by bolts. This arrangement makes it possible that the mating surfaces of the bolted angle sides only are to be machined, whereas the other angle sides in their unmachined condition are secured by welding to the corresponding surface portions of the section pipes which have been preliminarily assembled and aligned.

Due to the fact that practically all structural parts such as cross-beams, transverse and diagonal beams and stiffening pieces are made of section tubes of rectangular cross-section, a considerable reduction of weight and of the load-deflection, simultaneously with the increase of the rigidness of the entire structure, will result. The employed section pipes do not need accurate machining since only the above mentioned simple angle irons are worked on their mating surfaces of the bolted angle sides. It is necessary only to preassemble and align the section pipes before welding the unmachined other sides of the angle irons.

In a further development of this invention, one or more boxes containing the entire electric equipment of the machine are mounted on the rear side of the front cross-beam. These electrical boxes are dust-tight and are connected one to another and to respective drives in the wheel boxes by disconnectable connectors. The connectors permit a substantially easier assembly and disassembly and, consequently, much shorter transit times. Since the machine can be disassembled for shipment, no dead spaces will result and considerable savings on packing material are attained. The machine can consequently be designed without limitations as to the dimensions and weight. Also the overhead charges in the production of such machines are substantially reduced because of the fact that the oversized machine tools for the machining of large cross-beams and transverse beams are no longer necessary.

BRIEF DESCRIPTION OF SEVERAL VIEWS OF THE DRAWING

For a better understanding of the invention, reference is made to the following detailed description of an exemplary embodiment taken in conjunction with the accompanying drawing, in which.

DETAILED DESCRIPTION

Figure 1:
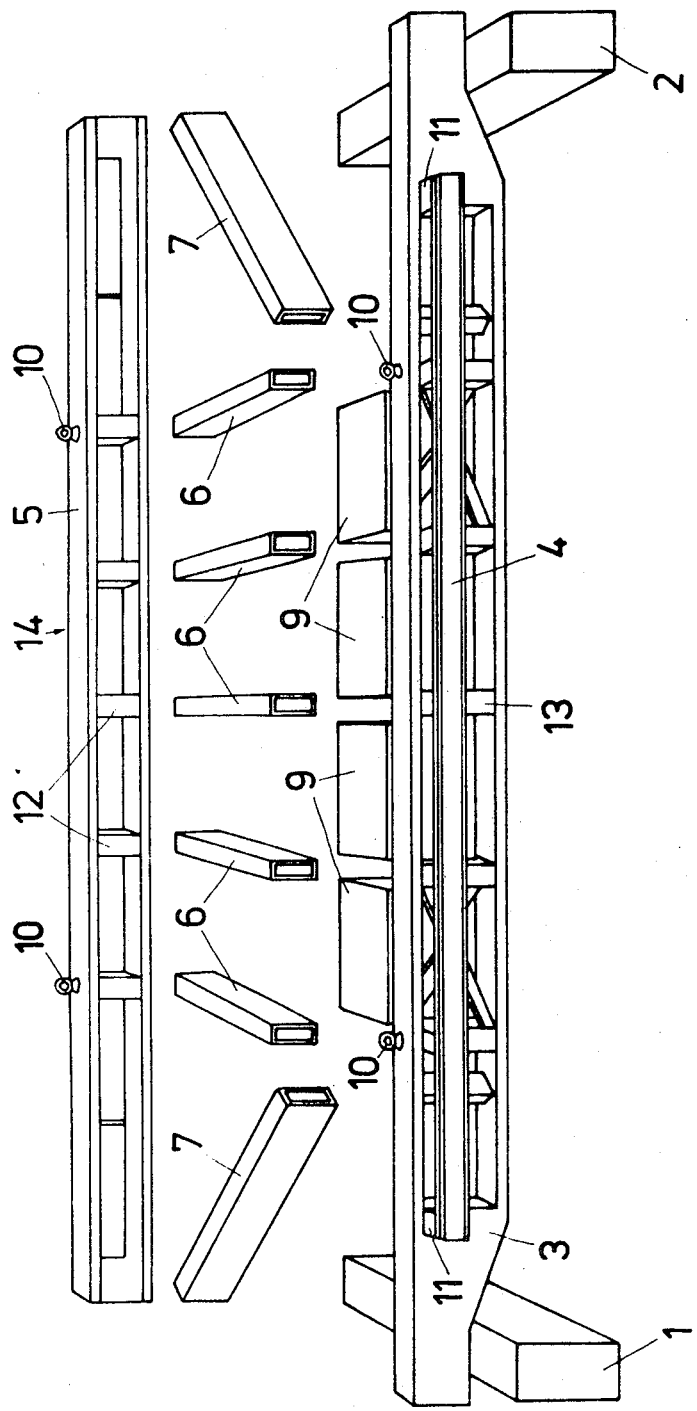
FIG. 1 is an exploded perspective side view of the carriage structure for the coordinate gas cutting machines of this invention.
Figure 2:
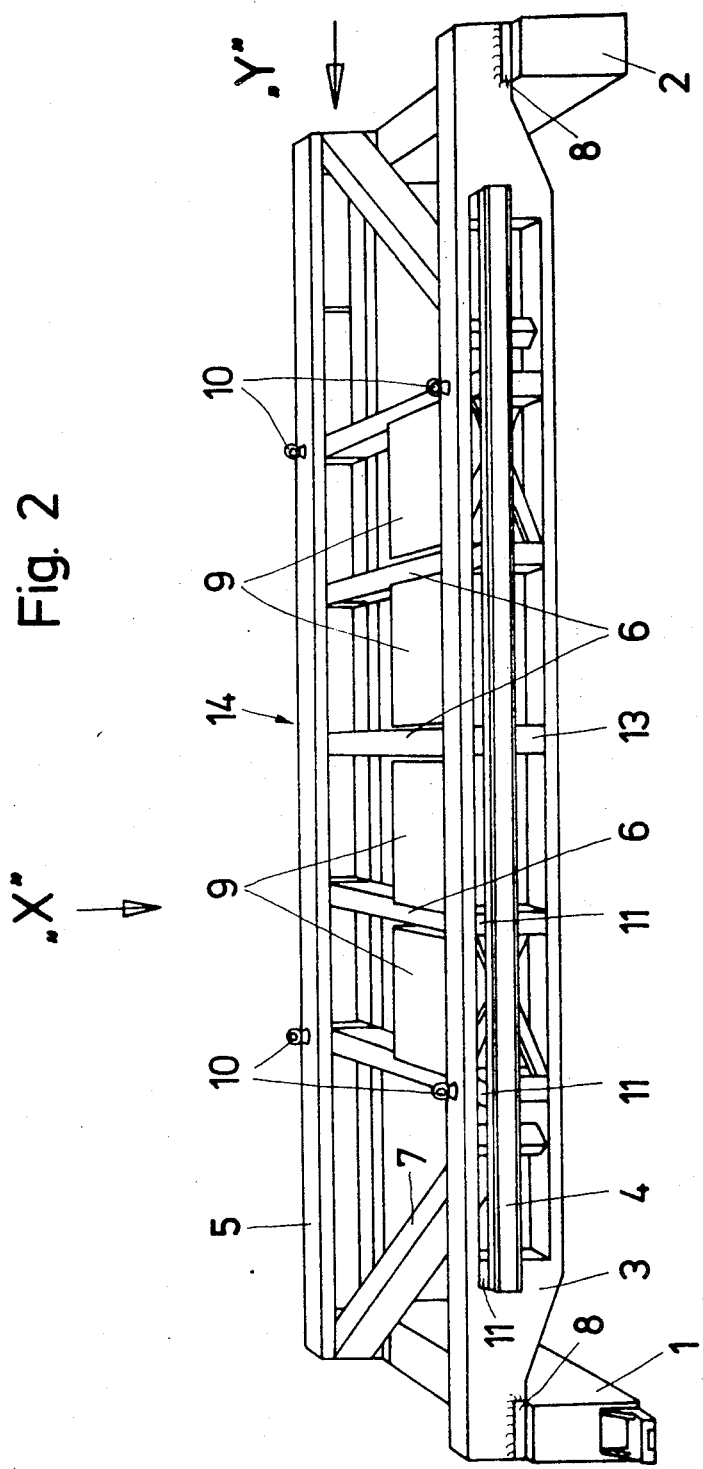
FIG. 2 is a perspective side view of the assembled carriage structure of FIG. 1.

As shown in FIGS. 1 and 2, the carriage 14 for the coordinate gas cutting machines is composed substantially of two wheel boxes 1 and 2, of a front cross-beam 3 and a rear cross-beam 5, of reinforcing transverse beams 6 and diagonal beams 7, of stiffening pieces 12 and 13 and of boxes 9 for receiving the electric equipment of the machine. These dust-tight boxes 9 are mounted between the reinforcing transverse beams 6 at the rear side of the front cross-beam 3, and are made of steel, aluminum or plastic. Along the front side of the front cross-beam 3, a track 4 for the cross-carriage is supported on brackets 11.

Figure 3:
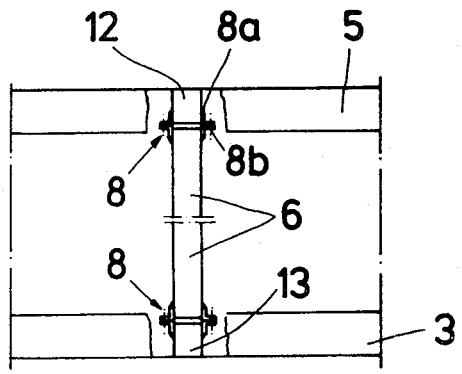
FIG. 3 is a cutaway plan view of a central portion of the carriage structure of FIG. 2, taken in the direction of arrow "X"
Figure 4:
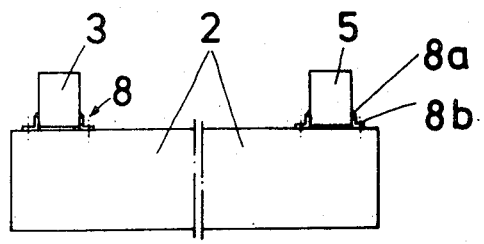
FIG. 4 is a partial side view of an end portion of the carriage structure of FIG. 2, taken in the direction of arrow "Y"
Figure 5:
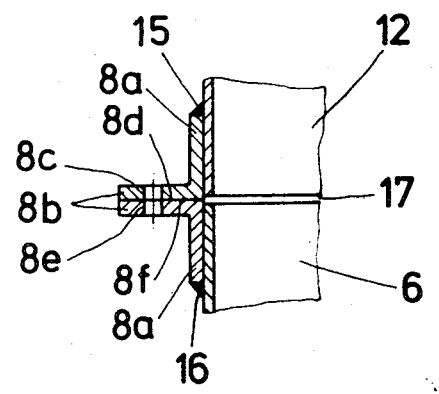
FIG. 5 is a sectional elevational view of a connection between two section pipes of this invention.

According to one feature of this invention, the cross-beams 3 and 5, the reinforcing diagonal beams 7 and transverse beams 6, as well as the stiffening pieces 12 and 13 and the wheel boxes 1 and 2 are made of section pipes of rectangular cross-section and are joined together by simple angular irons 8, as illustrated in FIGS. 3 to 5. With reference to FIGS. 3 and 4, one side 8b of an angle iron 8 is accurately machined as to be bolted to a corresponding machined surface of another angle iron or to the surface portion of wheel boxes 1 and 2 (FIG. 4). The other angle sides 8a of the angle irons 8 remain unmachined and are welded in this blank condition to corresponding structural parts. These structural parts, prior to the welding, have been temporarily preassembled and aligned, into a complete carriage structure. After the completion of the welding of the unmachined sides of the angle irons 8, the carriage 14 is disassembled again by loosening the bolts which connect the machined sides 8b. The individual structural parts, as shown in FIG. 1, can be shipped without difficulties. The boxes 9 with the electrical equipment, can remain attached to the rear side of the front cross-beam 3. The cross-beams 3 and 5 which are made of light rectangular section pipes reinforced by stiffening pieces 12 and 13, are reduced in weight in comparison with prior art cross-beams and are free of any load deflections.

FIG. 5 illustrates in a greater detail the connection site of two structural parts 6 and 12 having the form of rectangular pipes. The connection is accomplished by a pair of angle irons 8 having accurately machined mating surfaces 8d and 8f of the adjacent angle sides 8c and 8e. These adjacent angle sides are connected by a bolt, as schematically illustrated by dashed lines. The structural pipes 6 and 12 have been set up and aligned into a temporary carriage structure, whereby minute gaps 17 resulting between the ends of the pipes are bridged by the unmachined sides 8a of the bolted angle iron pairs. Subsequently, these angle sides 8a are rigidly connected by welding seams 15 and 16 to the abutting surfaces of the pieces 6 and 12.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A knock-down carriage structure for use in connection with coordinate gas cutting machines
   comprising, in combination,
   a plurality of prefabricated structural tubular parts assembled in girder fashion and adapted to support one or more gas torches, and
   a series of simple angle pieces, one arm of each angle piece being non-releasably connected to the exterior of an end portion of a corresponding structural part in such a manner that the other arm of the angle piece projects beyond said end of the structural part, said other arms of adjoining angle pieces being in abutment and releasably interconnected, the interabutting surfaces being so machined that the structural parts are assemblable in situ free from welding.

2. A carriage structure according to claim 1, said structural parts being made of pipes of rectangular cross-section.

3. A carriage structure according to claim 1, each of said angle pieces having an accurately machined side and an unmachined side, said machined side being bolted to a machined side of another angle piece, whereby the unmachined sides of the bolted angle pieces are welded to corresponding structural parts to be connected.

4. A carriage structure according to claim 1, said plurality of prefabricated structural parts including wheel boxes, longitudinal cross-beams, reinforcing beams, stiffening section pipes, and at least one box for receiving the electrical equipment of said machine.

* * * * *